United States Patent
Li et al.

(10) Patent No.: US 12,503,572 B2
(45) Date of Patent: Dec. 23, 2025

(54) EFFICIENT PHOSPHORUS-CONTAINING TOUGHENING REACTIVE FLAME RETARDANT AND PREPARATION METHOD THEREOF, AND FLAME-RETARDANT THERMOSETTING RESIN

(71) Applicants: CHONGQING JIAOTONG UNIVERSITY, Chongqing (CN); IMDEA MATERIALS INSTITUTE, Madrid (ES)

(72) Inventors: Zhi Li, Chongqing (CN); De-Yi Wang, Madrid (ES); Lei Zhang, Chongqing (CN); Xuemeng Cao, Chongqing (CN); En Tang, Chongqing (CN); Xiaodie Zhang, Chongqing (CN); Linyun Jiang, Chongqing (CN)

(73) Assignees: CHONGQING JIAOTONG UNIVERSITY, Chongqing (CN); IMDEA MATERIALS INSTITUTE, Madrid (ES)

( * ) Notice: Subject to any disclaimer, the term of this patent is extended or adjusted under 35 U.S.C. 154(b) by 745 days.

(21) Appl. No.: 17/995,885

(22) PCT Filed: Jul. 18, 2022

(86) PCT No.: PCT/CN2022/106239
§ 371 (c)(1),
(2) Date: Oct. 10, 2022

(87) PCT Pub. No.: WO2024/016107
PCT Pub. Date: Jan. 25, 2024

(65) Prior Publication Data
US 2025/0092226 A1    Mar. 20, 2025

(51) Int. Cl.
*C08K 5/53*    (2006.01)
*C08K 5/55*    (2006.01)

(52) U.S. Cl.
CPC ............... *C08K 5/53* (2013.01); *C08K 5/55* (2013.01); *C08K 2201/00* (2013.01)

(58) Field of Classification Search
CPC ........ C08K 5/53; C08K 5/55; C08K 2201/00; C08K 5/0066; C08K 5/5205; C08K 5/5313; C07F 9/40; C07F 9/6574
See application file for complete search history.

(56) References Cited

U.S. PATENT DOCUMENTS

2014/0343183 A1* 11/2014 Gaan ................. C09K 21/12
                                                              521/170
2021/0198542 A1*  7/2021 Lu .................... C08L 79/02

FOREIGN PATENT DOCUMENTS

CN    108864193 A  * 11/2018    ........... C08L 63/00
CN    113652001 A  * 11/2021    ........... C07F 9/4075
JP    2002138096 A    5/2002

* cited by examiner

*Primary Examiner* — Doris L Lee
(74) *Attorney, Agent, or Firm* — Bryan D. Zerhusen, Esq.; Nicholas R. Herrel, Esq.; CANTOR COLBURN LLP

(57) ABSTRACT

The present disclosure provides an efficient phosphorus-containing toughening reactive flame retardant and a preparation method thereof, and a flame-retardant thermosetting resin, and relates to the technical field of material flame retardancy. In the present disclosure, the reactive flame retardant includes phosphorus, and can improve a flame-retardant performance of the thermosetting resin; meanwhile, the flame retardant further includes reactive N—H activated bonds that can participate in a curing reaction of the thermosetting resin, increasing a degree of cross-linking of the thermosetting resin to further improve tensile properties; in addition, the reactive flame retardant further includes a sacrificial bond structure to improve an impact performance of the thermosetting resin.

20 Claims, 3 Drawing Sheets

EFFICIENT PHOSPHORUS-CONTAINING TOUGHENING REACTIVE FLAME RETARDANT AND PREPARATION METHOD THEREOF, AND FLAME-RETARDANT THERMOSETTING RESIN

CROSS-REFERENCE TO RELATED APPLICATIONS

The present application is a National Stage entry of International Patent Application PCT/CN2022/106239, filed 18 Jul. 2022 and titled "EFFICIENT PHOSPHORUS-CONTAINING TOUGHENING REACTIVE FLAME RETARDANT AND PREPARATION METHOD THEREOF, AND FLAME-RETARDANT THERMOSETTING RESIN", which is incorporated herein by reference in its entirety.

TECHNICAL FIELD

The present disclosure relates to the technical field of material flame retardancy, in particular to an efficient phosphorus-containing toughening reactive flame retardant and a preparation method thereof, and a flame-retardant thermosetting resin.

BACKGROUND ART

Thermosetting resins have become one of the most widely-used polymer materials due to excellent mechanical properties, processability, electrical properties, heat resistance, and stable chemical properties. The thermosetting resins are widely used in automotive machinery, electronic appliances, aerospace and other high-precision fields. However, as polymers, the thermosetting resins have obvious disadvantages, and most of thermosetting resins are flammable materials, limiting uses thereof to a large extent. It has become a key to current researches to improve flame retardant properties of the thermosetting resins.

Studies have shown that additive flame retardants can effectively improve flame retardant properties of the thermosetting resins, but generally damage tensile properties and impact properties of the thermosetting resins to varying degrees. Reactive flame retardants have a little effect on the tensile properties and impact properties of the thermosetting resins while improving the flame retardant properties, but have difficulties in improving the tensile properties and impact properties.

For example, Chinese patent CN108997714A disclosed a reactive flame retardant for an epoxy resin, and the reactive flame retardant was added to the epoxy resin to provide a flame-retardant epoxy resin. However, while having desirable flame retardant properties, the flame-retardant epoxy resin has only a small impact on mechanical properties and other properties, and does not achieve simultaneous improvement in the tensile properties and impact properties.

At present, there is still a lack of flame retardants capable of simultaneously improving flame retardant properties, tensile properties, and impact properties of the thermosetting resins.

SUMMARY

An objective of the present disclosure is to provide an efficient phosphorus-containing toughening reactive flame retardant and a preparation method thereof, and a flame-retardant thermosetting resin. The flame retardant can achieve simultaneous and efficient improvement of the flame retardant properties, tensile properties, and impact properties of the thermosetting resin.

To achieve the above objective, the present disclosure provides the following technical solutions:

The present disclosure provides a reactive flame retardant, having a structure shown in Formula 1:

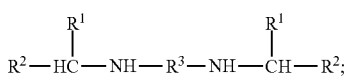

Formula 1 where
in Formula 1, $-R^1$ has an atomic composition as follows: $-[(CH)_n(CH_2)_m(CH_3)_p(C)_r(OH)_y(COOH)_l O_x H_z]$, and n, m, p, r, y, l, x, and z are independently an integer of 0 to 20 but are not 0 at the same time;
$-R^2$ has an atomic composition as follows: $-PO[(CH_2)_{n'}(CH)_{m'}(CH_3)_{p'}(C)_{r'}(OH)_{y'}(COOH)_{l'} O_{x'} H_{z'}]$, and n', m', p', r', y', l', x', and z' are independently an integer of 0 to 20 but are not 0 at the same time; and
$-R^3-$ is any one of structures shown in (a) to (i) (showing below).

Preferably, $-R^1$ may be:

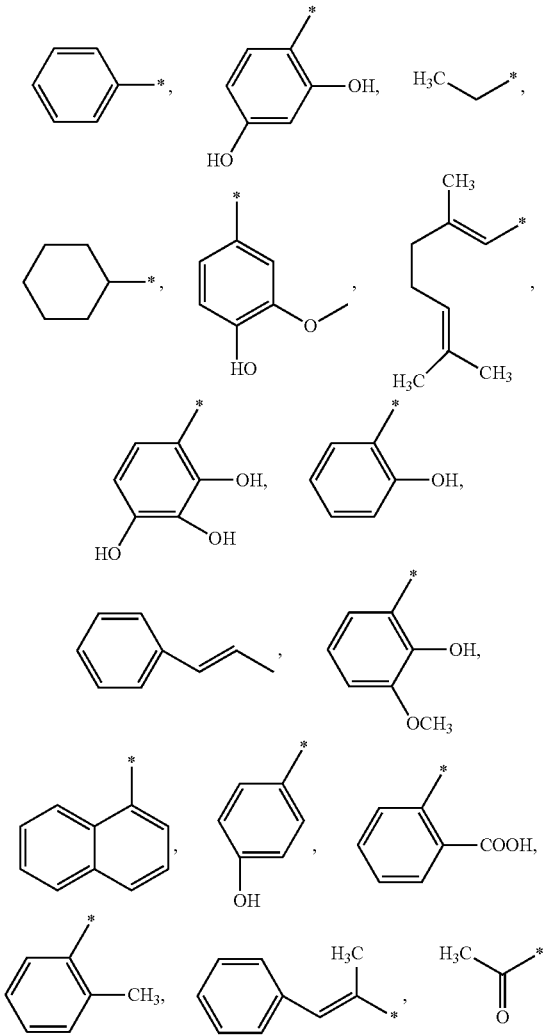

-continued

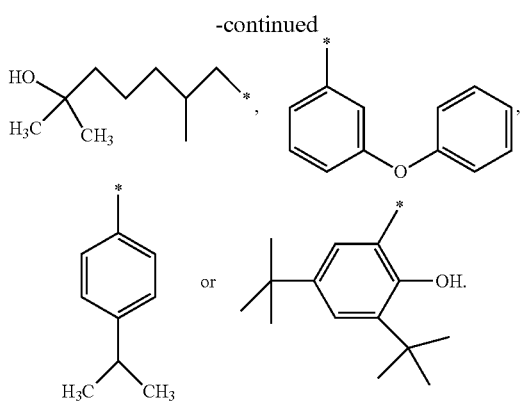

Preferably, —R² may be:

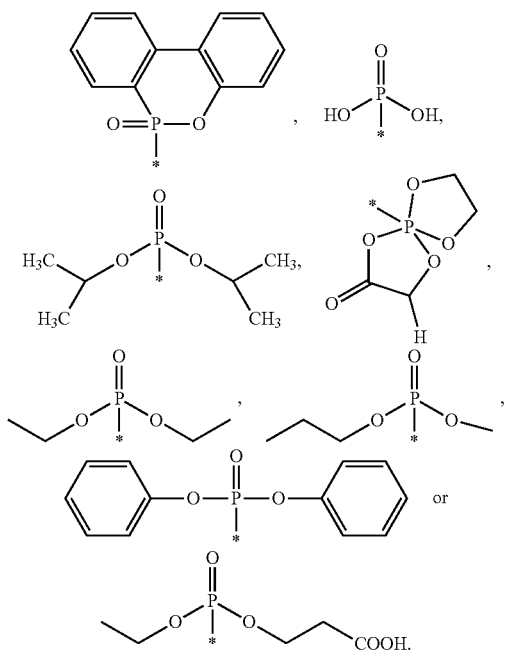

Preferably, the reactive flame retardant may have a structure shown in any one of Formula 2 to Formula 9 (showing below).

The present disclosure further provides a preparation method of the reactive flame retardant, including the following steps:
dissolving H₂N—R³—NH₂ in a polar organic solvent, adding R¹CHO to an obtained solution, and conducting nucleophilic substitution to obtain

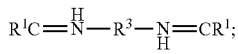

and
mixing the

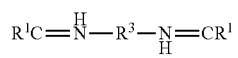

with R²H, and conducting an addition reaction to obtain the reactive flame retardant having a structure shown in Formula 1 as follows:

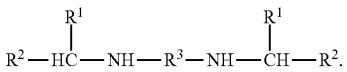

Formula 1

Preferably, the H₂N—R³—NH₂ and the R¹CHO may have a molar ratio of 1:2.

Preferably, the

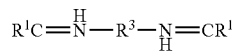

and the R²H may have a molar ratio of 1:2.

Preferably, the polar organic solvent may be selected from the group consisting of a monohydric alcohol and a cyclic ether.

Preferably, the monohydric alcohol may include ethanol; and the cyclic ether may include tetrahydrofuran.

Preferably, the nucleophilic substitution may be conducted at 30° C. to 80° C.

Preferably, the nucleophilic substitution may be conducted for 8 h to 12 h.

Preferably, the addition reaction may be conducted at 30° C. to 80° C.

Preferably, the addition reaction may be conducted for 8 h to 24 h.

Preferably, the preparation method may further include the following steps after the addition reaction is completed: removing the polar organic solvent in an obtained addition reaction product, and washing and drying the addition reaction product sequentially.

The present disclosure further provides a flame-retardant thermosetting resin, including the following raw materials in parts by weight: 30 parts to 35 parts of a thermosetting resin, 1 part to 3 parts of a flame retardant, and 7 parts to 9 parts of a curing agent; where the flame retardant is the reactive flame retardant or a reactive flame retardant prepared by the preparation method.

Preferably, the flame-retardant thermosetting resin may further include 0.2 parts to 0.5 parts of an auxiliary agent.

Preferably, the thermosetting resin may be selected from the group consisting of an epoxy resin, a phenolic resin, a urea-formaldehyde resin, and an unsaturated polyester.

Preferably, when the thermosetting resin is the epoxy resin, the curing agent may include one or more of 4,4-diaminodiphenylmethane, 4,4-diaminophenylsulfone, methyltetrahydrophthalic anhydride, and methylhexahydrophthalic anhydride;

when the thermosetting resin is the phenolic resin, the curing agent may include one or more of p-toluenesulfonic acid, benzenesulfonic acid, phosphoric acid, and phenolsulfonic acid;

when the thermosetting resin is the urea-formaldehyde resin, the curing agent may include one or more of ammonium chloride, phosphoric acid, and hydrogen peroxide; and when the thermosetting resin is the unsaturated polyester, the curing agent may include divinylbenzene and/or methyl ethyl ketone peroxide.

Preferably, when the thermosetting resin is the epoxy resin, the auxiliary agent may include an antioxidant;

when the thermosetting resin is the phenolic resin or the urea-formaldehyde resin, the auxiliary agent may include a catalyst; and when the thermosetting resin is the unsaturated polyester, the auxiliary agent may include an accelerator.

Preferably, where the antioxidant may be selected from the group consisting of a phosphite antioxidant, a hindered phenol antioxidant, and a hindered amine antioxidant;

when the thermosetting resin is the phenolic resin, the catalyst may include one or more of sodium hydroxide, ammonia water, and ammonium sulfate; when the thermosetting resin is the urea-formaldehyde resin, the catalyst may include phenol; and the accelerator may include cobalt naphthenate.

In the present disclosure, the reactive flame retardant includes phosphorus, and can improve a flame-retardant performance of the thermosetting resin; meanwhile, the flame retardant further includes reactive N—H activated bonds that can participate in a curing reaction of the thermosetting resin, increasing a degree of cross-linking of the thermosetting resin to further improve tensile properties; in addition, the reactive flame retardant further includes a sacrificial bond structure (specifically, a sacrificial bond, a boronate bond, a disulfide bond, a phosphate bond, a hemiacetal ester bond, or an acetic acid bond of a Diels-Alder reaction), which may preferentially break when being impacted, consuming a part of intermolecular internal energy, so as to improve an impact performance of the thermosetting resin.

The results of examples show that the reactive flame retardant has a high flame-retardant efficiency; the flame retardant can be added at only 2.2 wt % to 7.5 wt % of all the raw materials, and the thermosetting resin (taking epoxy resin as an example) can have a limiting oxygen index of 30% to 33%, a vertical burning test level of V-0 (3.2 mm spline), a tensile strength of 70 MPa, and an unnotched impact strength of 13.8 KJ m$^{-2}$.

In the present disclosure, the flame-retardant thermosetting resin adopts a specific addition ratio of raw materials; compared with pure thermosetting resins, the flame-retardant thermosetting resin has excellent flame retardancy, and improved tensile properties and impact properties, which greatly increases a use range of the material.

In the present disclosure, the preparation method of the reactive flame retardant adopts a one-pot method, which is simple and safe, and has low-cost and easily-available raw materials.

In the present disclosure, the preparation method of the flame-retardant thermosetting resin has a simple process, low-cost raw materials, short production cycle, and easily-controlled procedures, which is suitable for industrial production.

DETAILED DESCRIPTION OF THE EMBODIMENTS

Figure 1:
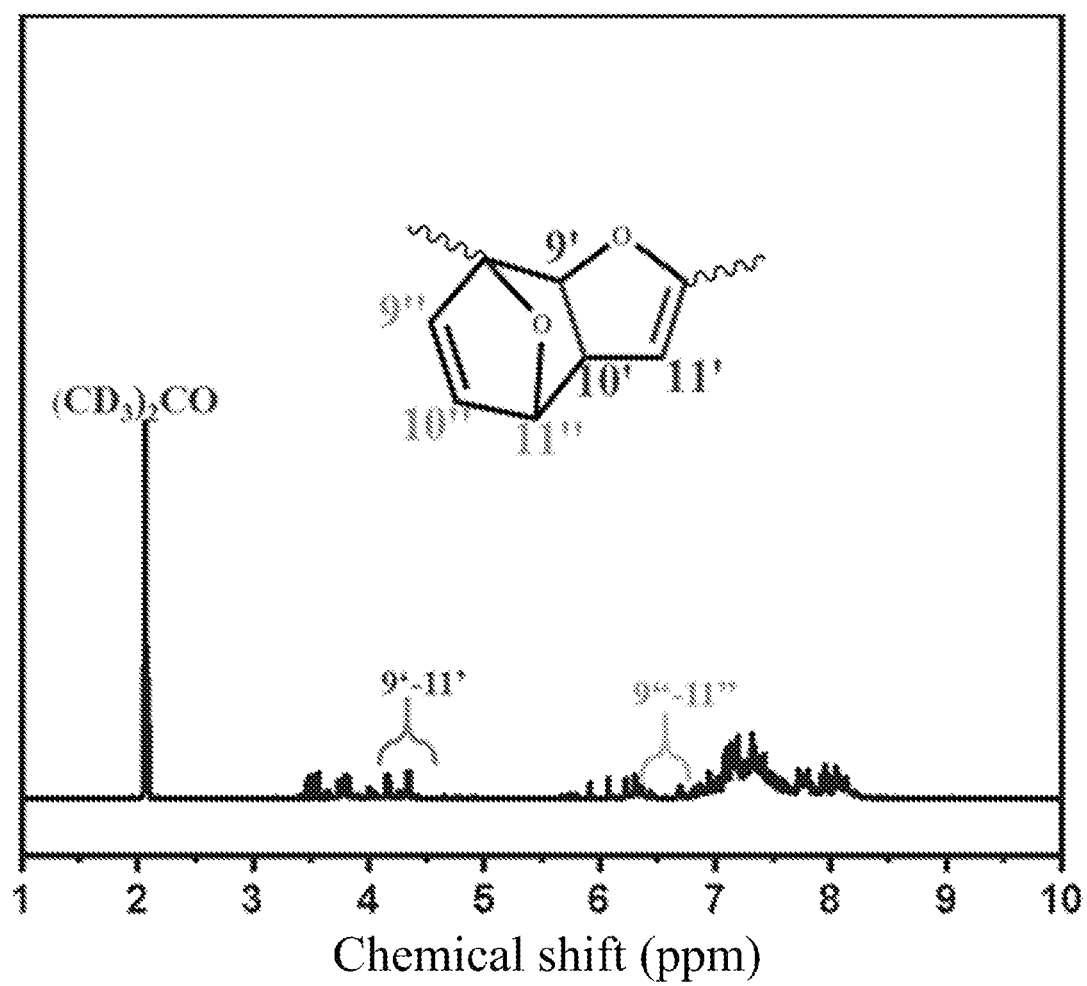
FIG. 1 shows a hydrogen spectrogram of a flame retardant prepared in Example 1.

The present disclosure is further described below with reference to the accompanying drawings and examples.

The present disclosure provides a reactive flame retardant, having a structure shown in Formula 1:

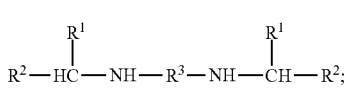

Formula 1 where in Formula 1, —$R^1$ has an atomic composition as follows:

—[$(CH)_n(CH_2)_m(CH_3)_p(C)_r(OH)_y(COOH)_l O_x H_z$], and n, m, p, r, y, l, x, and z are independently an integer of 0 to 20 but are not 0 at the same time;

—$R^2$ has an atomic composition as follows:

—PO[$(CH_2)_{n'}(CH)_{m'}(CH_3)_{p'}(C)_{r'}(OH)_{y'}(COOH)_{l'}O_{x'}H_{z'}$], and n', m', p', r', y', l', x', and z' are independently an integer of 0 to 20 but are not 0 at the same time; and —$R^3$— is any one of structures shown in (a) to (i):

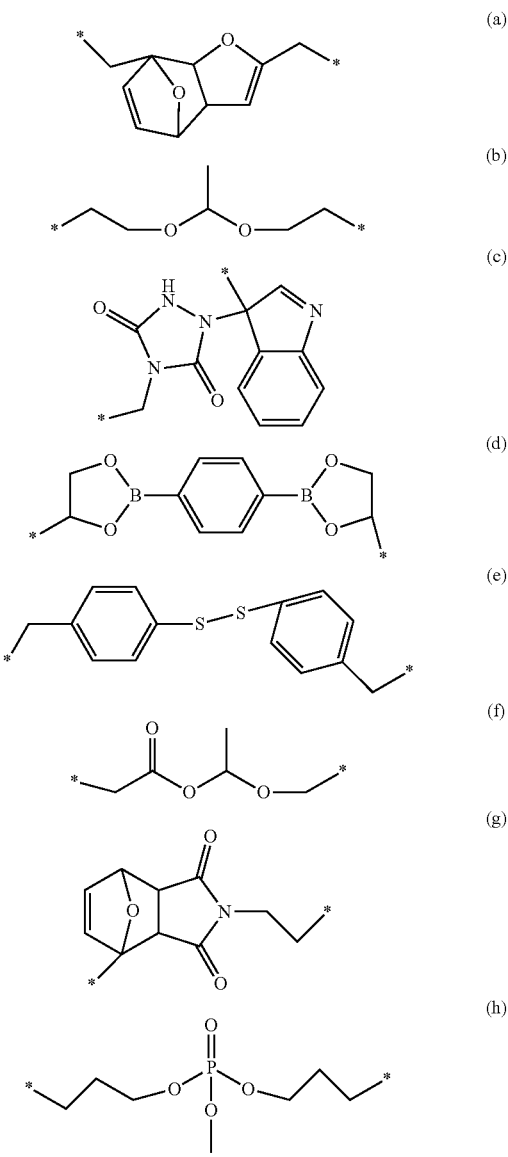

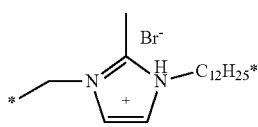

In the present disclosure, in the atomic composition of —R¹: n, m, p, r, y, l, x, and z are independently preferably an integer of 0 to 10 but are not 0 at the same time.

In the present disclosure, a bond of the —[(CH)$_n$(CH$_2$)$_m$(CH$_3$)$_p$(C)$_r$(OH)$_y$(COOH)$_l$O$_x$H$_z$] is written outside "[ ]", which means that it may be attached to any atom or group of atoms in "[ ]".

In the present disclosure, the —R¹ is preferably:

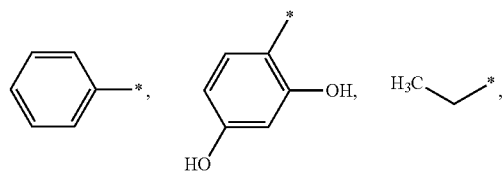

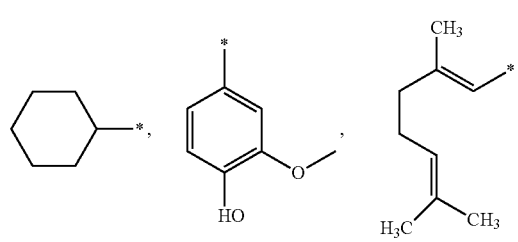

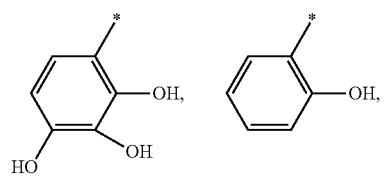

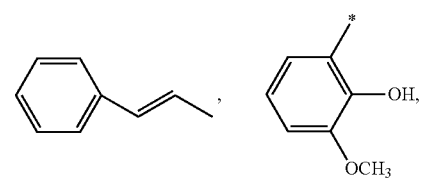

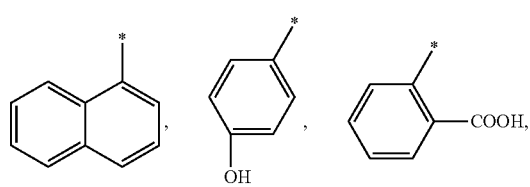

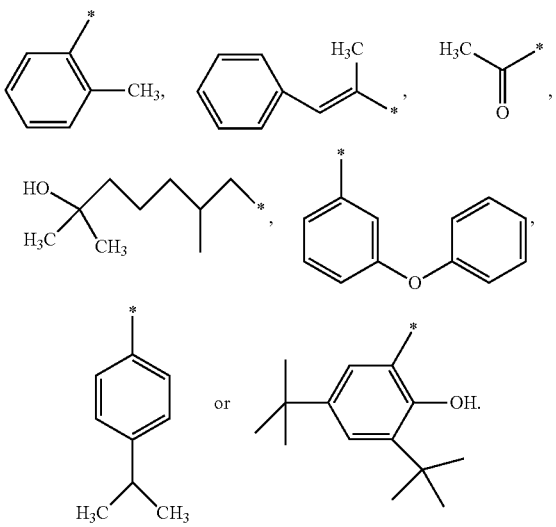

In the present disclosure, in the atomic composition of —R²: n', m', p', r', y', l', x', and z' are independently preferably an integer of 0 and 10 but are not 0 at the same time.

In the present disclosure, the —R² is preferably:

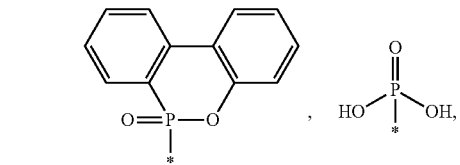

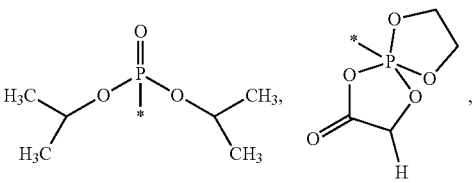

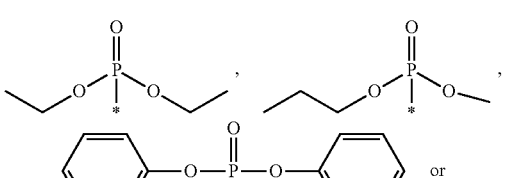

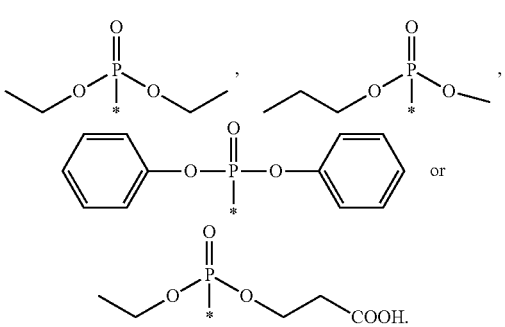

In the present disclosure, the reactive flame retardant has a structure preferably shown in any one of Formula 2 to Formula 9:

Formula 2
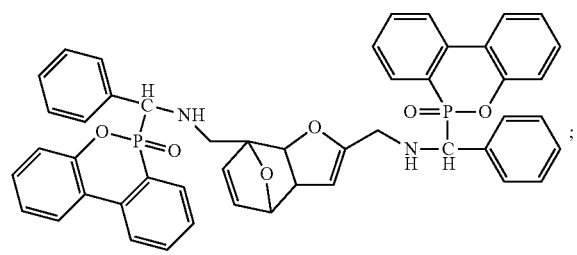
Formula 3
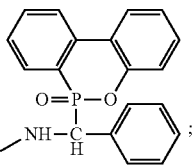
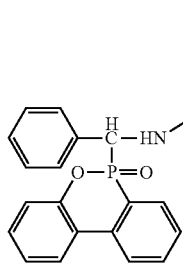
Formula 4
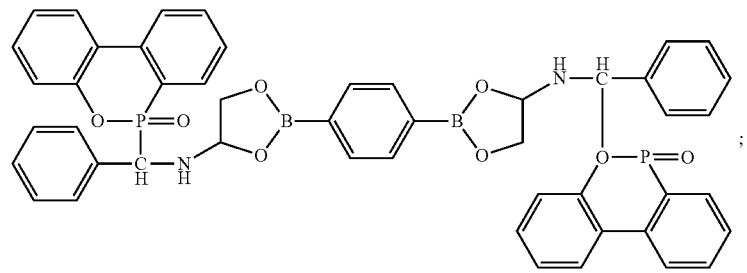
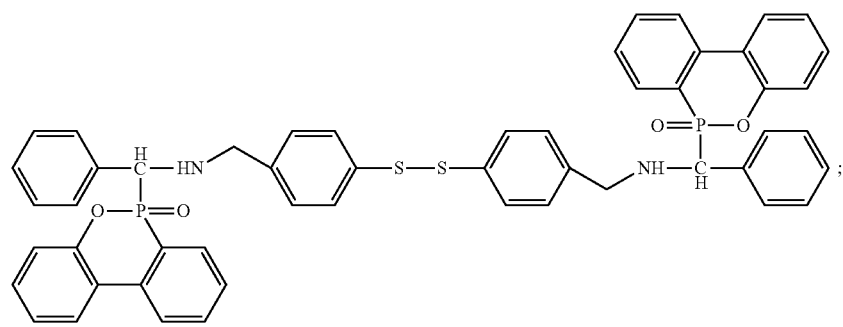
Formula 6
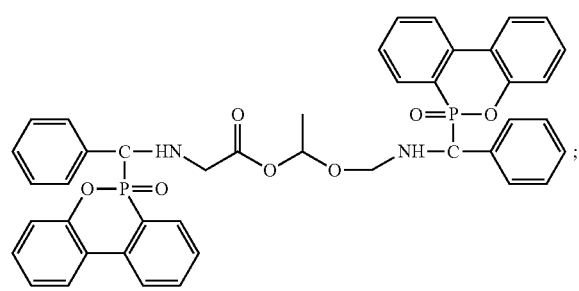
Formula 7
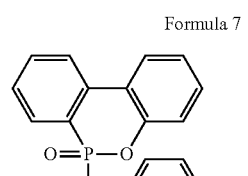
; and
Formula 8
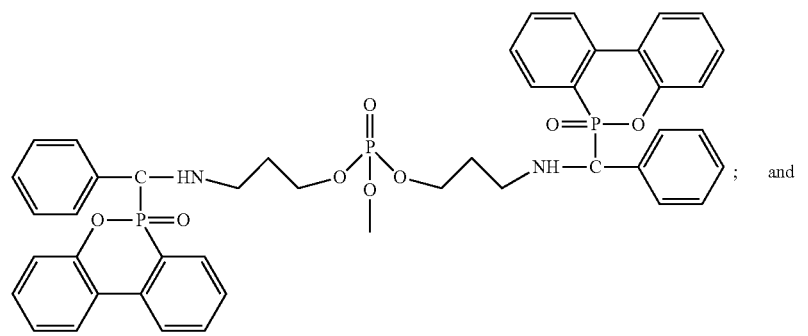

-continued

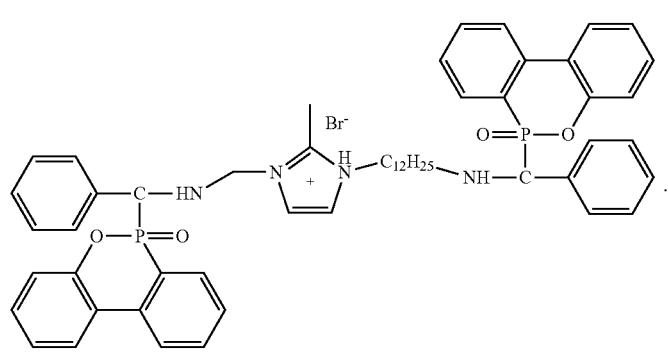

In the present disclosure, the reactive flame retardant includes phosphorus, and can improve a flame-retardant performance of the thermosetting resin; meanwhile, the flame retardant further includes reactive N—H activated bonds that can participate in a curing reaction of the thermosetting resin, increasing a degree of cross-linking of the thermosetting resin to further improve tensile properties; in addition, the reactive flame retardant further includes a sacrificial bond structure (specifically, a sacrificial bond, a boronate bond, a disulfide bond, a phosphate bond, a hemiacetal ester bond, or an acetic acid bond of a Diels-Alder reaction), which may preferentially break when being impacted, consuming a part of intermolecular internal energy, so as to improve an impact performance of the thermosetting resin.

The present disclosure further provides a preparation method of the reactive flame retardant, including the following steps:

dissolving $H_2N—R^3—NH_2$ in a polar organic solvent, adding $R^1CHO$ to an obtained solution, and conducting nucleophilic substitution to obtain

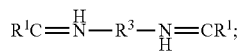

and
mixing the

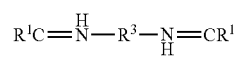

with $R^2H$, and conducting an addition reaction to obtain the reactive flame retardant having a structure shown in Formula 1 as follows:

Formula 1

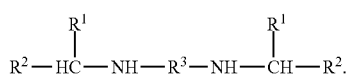

In the present disclosure, the raw materials used are all commercially available products known in the art or prepared by methods known in the art.

In the present disclosure, the $H_2N—R^3—NH_2$ is dissolved in the polar organic solvent, the $R^1CHO$ is added to the obtained solution, and nucleophilic substitution is conducted to obtain the

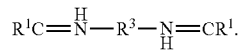

In the present disclosure, the polar organic solvent may be preferably selected from the group consisting of a monohydric alcohol and a cyclic ether; the monohydric alcohol includes preferably ethanol; and the cyclic ether includes preferably tetrahydrofuran. There is no special requirement for an amount of the polar organic solvent, as long as $H_2N—R^3—NH_2$ can be completely dissolved.

In the present disclosure, the $R^1CHO$ is preferably added dropwise; there is no special requirement for a rate of the dropwise addition, and the $R^1CHO$ can be added dropwise. The $R^1CHO$ is added dropwise preferably within 30 min. The dropwise addition facilitates a more complete reaction.

In the present disclosure, the $H_2N—R^3—NH_2$ and the $R^1CHO$ have a molar ratio of preferably 1:2. The nucleophilic substitution is conducted at preferably 30° C. to 80° C., more preferably 40° C. to 70° C., and further more preferably 50° C. to 60° C. for preferably 8 h to 12 h, more preferably 9 h to 11 h, and further more preferably 10 h. The nucleophilic substitution is conducted preferably under stirring. The nucleophilic substitution is conducted preferably under an atmosphere of air or nitrogen. An equation for the nucleophilic substitution is:

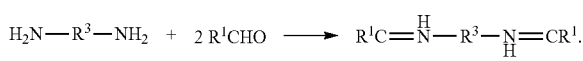

In the present disclosure, after the nucleophilic substitution is completed, preferably without any post-treatment, a nucleophilic substitution product

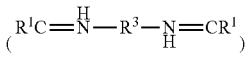

is directly mixed with the $R^2H$, and an addition reaction is conducted to obtain the reactive flame retardant having a structure shown in Formula 1.

In the present disclosure, the mixing is preferably conducted by: adding the $R^2H$ to the

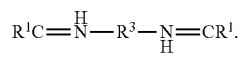

In the present disclosure, the

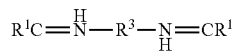

and the $R^2H$ have a molar ratio of preferably 1:2.

In the present disclosure, the addition reaction is conducted at preferably 30° C. to 80° C., more preferably 40° C. to 70° C., and further more preferably 50° C. to 60° C. for preferably 8 h to 24 h, more preferably 10 h to 20 h, and further more preferably 12 h to 16 h. The addition reaction is conducted preferably under stirring. The addition reaction is conducted preferably under an atmosphere of air or nitrogen. An equation for the addition reaction is:

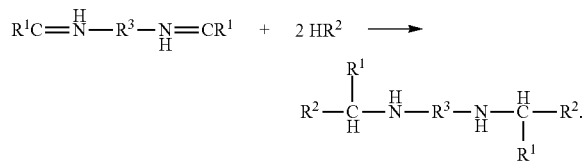

In the present disclosure, after the addition reaction is completed, the method preferably further includes post-treatment. When the flame retardant has a structure shown in Formula 2, the post-treatment includes preferably: after the addition reaction is completed, conducting centrifugation, and then washing with absolute ethanol for several times until a filtrate is colorless and transparent, to obtain the reactive flame retardant. When the flame retardant has other structures, the post-treatment includes preferably: removing the polar organic solvent in the addition reaction product, and washing and drying the addition reaction product sequentially to obtain the reactive flame retardant. The polar organic solvent is removed by preferably rotary evaporation. There is no special requirement for conditions of the rotary evaporation, and appropriate rotary evaporation conditions can be selected according to the type of polar organic solvent. When the polar organic solvent is ethanol or tetrahydrofuran, the rotary evaporation is conducted at 80° C. The washing includes preferably: washing with ethanol at 50° C., and then washing with hot water at 50° C. The drying is conducted at preferably 80° C.; there is no special requirement for a drying time, as long as the target is completely dried.

In the present disclosure, the reactive flame retardant is prepared by a one-pot method, which is simple and safe, and has low-cost and easily-available raw materials.

The present disclosure further provides a flame-retardant thermosetting resin, including the following raw materials in parts by weight: 30 parts to 35 parts of a thermosetting resin, 1 part to 5 parts of a flame retardant, and 7 parts to 9 parts of a curing agent; where the flame retardant is the reactive flame retardant or a reactive flame retardant prepared by the preparation method.

In the present disclosure, in parts by weight, the raw materials of the flame-retardant thermosetting resin include 30 parts to 35 parts, preferably 31 parts to 34 parts, and more preferably 32 parts to 33 parts of the thermosetting resin. The thermosetting resin is preferably selected from the group consisting of an epoxy resin, a phenolic resin, a urea-formaldehyde resin, and an unsaturated polyester. There is no special requirement on a specific type of the epoxy resin, the phenolic resin, the urea-formaldehyde resin, or the unsaturated polyester, and epoxy resins, phenolic resins, urea-formaldehyde resins, or unsaturated polyesters well known in the art may be acceptable. In an example, the epoxy resin is E-51; the urea-formaldehyde resin is 7130A; and the unsaturated polyester is 901.

In the present disclosure, based on a mass fraction of the thermosetting resin, the raw materials of the flame-retardant thermosetting resin include 1 part to 3 parts, preferably 1.2 parts to 2.5 parts, more preferably 1.5 parts to 2 parts of the flame retardant.

In the present disclosure, based on a mass fraction of the thermosetting resin, the raw materials of the flame-retardant thermosetting resin include 7 parts to 9 parts, preferably 7.5 parts to 8.5 parts of the curing agent. A type of the curing agent is preferably determined according to the type of the thermosetting resin. When the thermosetting resin is the epoxy resin, the curing agent includes preferably one or more of 4,4-diaminodiphenylmethane, 4,4-diaminophenylsulfone, methyltetrahydrophthalic anhydride, and methylhexahydrophthalic anhydride; when the thermosetting resin is the phenolic resin, the curing agent includes preferably one or more of p-toluenesulfonic acid, benzenesulfonic acid, phosphoric acid, and phenolsulfonic acid; when the thermosetting resin is the urea-formaldehyde resin, the curing agent includes preferably one or more of ammonium chloride, phosphoric acid, and hydrogen peroxide; and when the thermosetting resin is the unsaturated polyester, the curing agent includes divinylbenzene and/or methyl ethyl ketone peroxide. Regardless of the type of thermosetting resin, when there are multiple curing agents, there is no special requirement for a ratio of each curing agent, and any ratio can be used.

In the present disclosure, based on a mass fraction of the thermosetting resin, the raw materials of the flame-retardant thermosetting resin preferably further includes 0.2 parts to 0.5 parts, preferably 0.25 parts to 0.45 parts, and more preferably 0.3 parts to 0.4 parts of the auxiliary agent. A type of the auxiliary agent is preferably determined according to the type of the thermosetting resin. When the thermosetting resin is the epoxy resin, the auxiliary agent includes preferably an antioxidant; the antioxidant is preferably selected from the group consisting of a phosphite type antioxidant, a hindered phenol antioxidant, and a hindered amine antioxidant; there is no special requirement for a specific type of the phosphite antioxidant, the hindered phenol antioxidant, or the hindered amine antioxidant, and corresponding types of antioxidants well known in the art can be used. The phosphite antioxidant can be specifically triethyl phosphite, tributyl phosphite, and trioctyl phosphite; the hindered phenolic antioxidant can be specifically hydroquinone and thiobisphenol; and the hindered amine antioxidant can be specifically naphthylamine, diphenylamine, and p-phenylenediamine.

In the present disclosure, when the thermosetting resin is the phenolic resin or the urea-formaldehyde resin, the auxiliary agent includes preferably a catalyst; specifically, when the thermosetting resin is the phenolic resin, the catalyst includes preferably one or more of sodium hydroxide, ammonia water, and ammonium sulfate; when the thermosetting resin is the urea-formaldehyde resin, the catalyst includes preferably phenol. The catalyst is added to the phenolic resin and the urea-formaldehyde resin to accelerate the crosslinking reaction at an appropriate temperature.

When the thermosetting resin is the unsaturated polyester, the auxiliary agent includes preferably an accelerator, and the accelerator includes preferably cobalt naphthenate. The accelerator is added to the unsaturated polyester to control a rate of the reaction in a suitable range.

In the present disclosure, the flame-retardant thermosetting resin adopts a specific addition ratio of raw materials; compared with pure thermosetting resins, the flame-retardant thermosetting resin has an excellent flame retardancy, and improved mechanical properties, which greatly increases a use range of the material.

The present disclosure provides a preparation method of the flame-retardant thermosetting resin, including the following steps:
    mixing the raw materials under heating to obtain a homogeneous solution; and
    pouring the homogeneous solution into a mold, and curing to obtain the flame-retardant thermosetting resin.

In the present disclosure, the raw materials are mixed under heating to obtain the homogeneous solution.

In the present disclosure, before the mixing, the thermosetting resin is preferably preheated at preferably 50° C. to 80° C., more preferably 55° C. to 75° C., and further more preferably 60° C. to 70° C. for preferably 10 min to 30 min. The preheating is preferably conducted in a forced air oven. The preheating can improve a fluidity of the thermosetting resin.

In the present disclosure, the heating is conducted at preferably 50° C. to 80° C., more preferably 60° C. to 70° C. Mixing under heating makes it easier to uniformly stir and disperse the curing agent in the epoxy resin, resulting in a better curing effect.

In the present disclosure, the homogeneous solution is poured into the mold, and cured to obtain the flame-retardant thermosetting resin.

In the present disclosure, the homogeneous solution is preferably vacuum-degassed first, and then poured into the mold. There is no special requirement for a vacuum degassing process, and vacuum degassing processes well known in the art can be used. In an example, it is specifically evacuated in a vacuum oven at 80° C. for 5 min. The vacuum degassing can remove air bubbles in the thermosetting resin to prevent adverse effects on mechanical properties of the thermosetting resin.

In the present disclosure, there is no special requirement for the mold, and corresponding molds can be selected as required. In an example, it is poured into molds of vertical burning test splines, limiting oxygen index test splines, tensile splines, and impact splines. There is no special requirement for curing conditions, and curing conditions known in the art may be selected according to the types of thermosetting resins.

The efficient phosphorus-containing toughening reactive flame retardant and the preparation method thereof, and the flame-retardant thermosetting resin provided by the present disclosure will be described in detail below with reference to examples, but these examples should not be construed as limiting the scope of the present disclosure.

Example 1

In this example, a Diel-Alder dimer compound of 2-furanamine had a structural formula as follows:

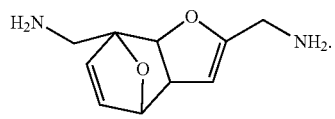 [SMILES: NCC1=CC2C3C=CC(CN)(O3)C2O1]

1 mol of the Diel-Alder dimer compound of 2-furanamine was dissolved in tetrahydrofuran, 2 mol of benzaldehyde was added dropwise, an obtained mixture was added dropwise to a flask within 5 min, and the nucleophilic substitution was conducted at 30° C. for 8 h under stirring; 2 mol of DOPO (9,10-dihydro-9-oxa-10-phosphaphenanthrene-10-oxide) was added, and an addition reaction was conducted under stirring at 80° C. for 8 h; a product was centrifuged and washed with absolute ethanol for several times until a filtrate was colorless and transparent, to obtain a flame retardant with a structure shown in Formula 2;

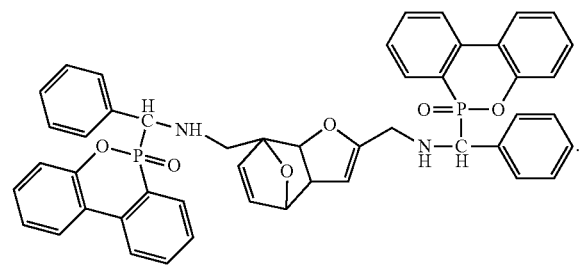

Formula 2

The flame retardant prepared in Example 1 was characterized by hydrogen spectrum, and the results were shown in FIG. 1. It was seen from FIG. 1 that the flame retardant structure

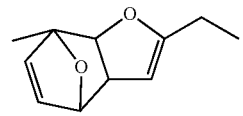

was successfully synthesized.

Figure 2:
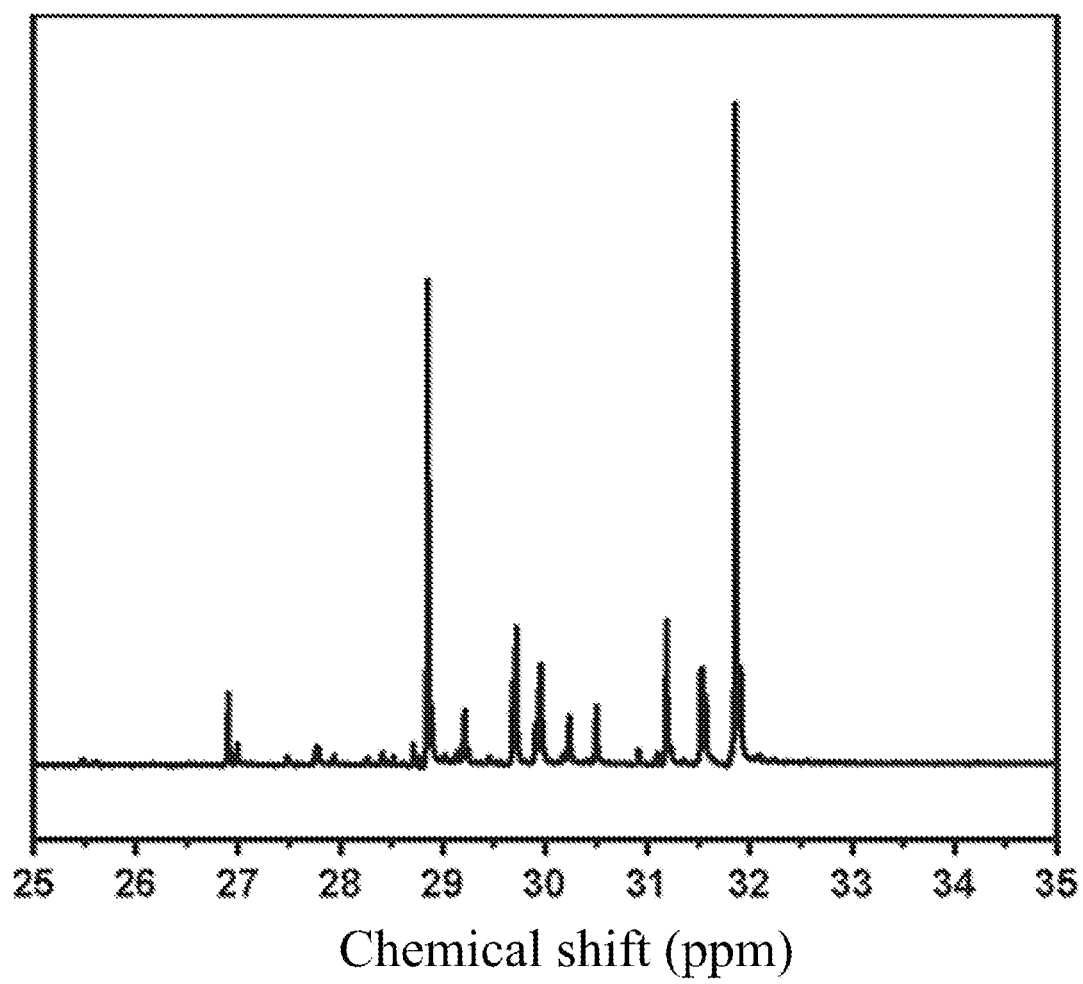
FIG. 2 shows a phosphorus spectrogram of the flame retardant prepared in Example 1.

The flame retardant prepared in Example 1 was characterized by phosphorus spectrum, and the results were shown in FIG. 2. It was seen from FIG. 2 that the two strong peaks belonged to the two phosphorus elements in the flame retardant structure.

Combining FIGS. 1 and 2, it was confirmed that the flame retardant with a structure shown in Formula 2 was successfully synthesized.

Figure 3:
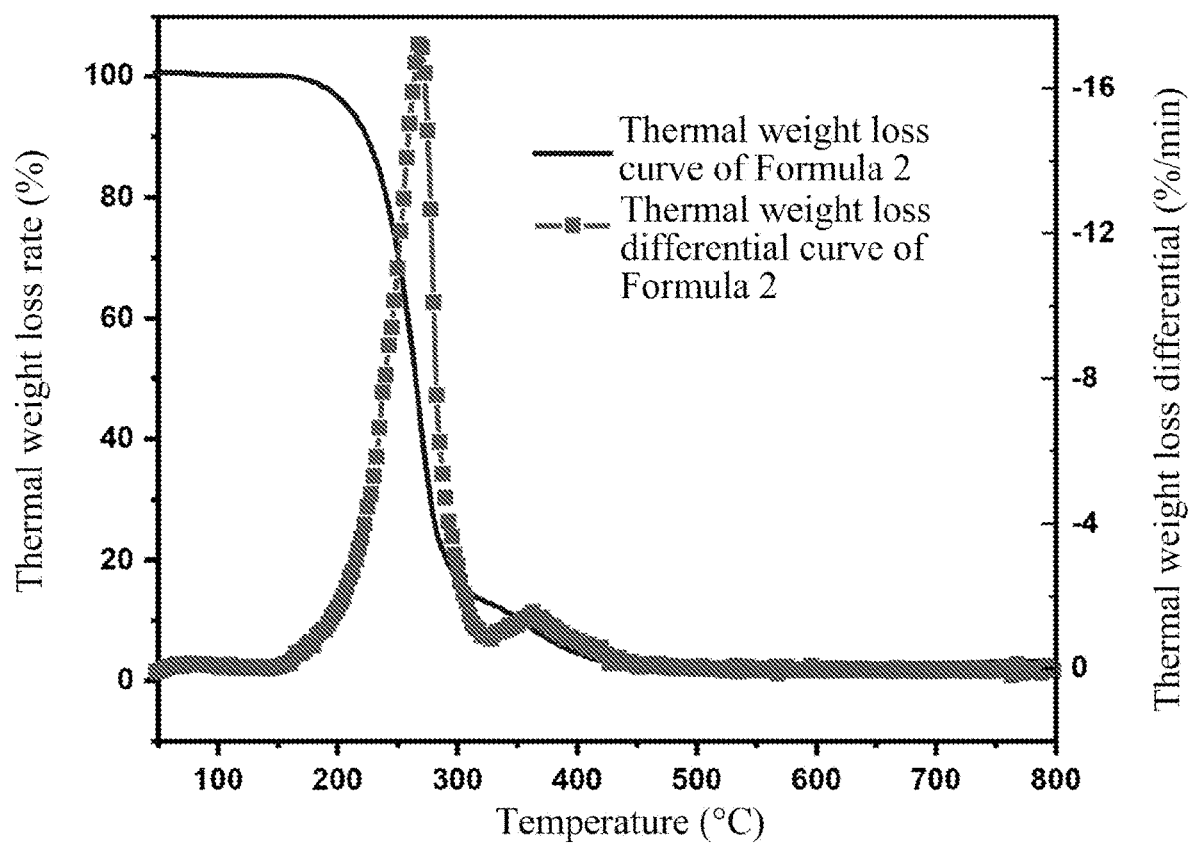
FIG. 3 shows a thermal weight loss curve of the flame retardant prepared in Example 1.

FIG. 3 shows a thermal weight loss curve of the flame retardant prepared in Example 1. It was seen from FIG. 3 that the flame retardant has a desirable thermal stability, and a curing temperature of the epoxy resin was lower than a thermal degradation temperature of the flame retardant, indicating that the flame retardant was suitable for curing the epoxy resin.

Example 2

In this example, a compound containing a terminal amino acetate sacrificial bond had a structural formula as follows:

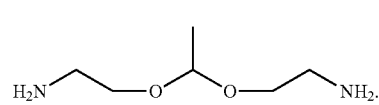

0.05 mol of the compound containing a terminal amino acetate sacrificial bond was dissolved in ethanol, added with 0.05 mol of benzaldehyde at 50° C., and a resulting mixture was added dropwise to a flask within 30 min; nucleophilic substitution was conducted under stirring for 6 h, 0.1 mol of DOPO was added, and an addition reaction was conducted at 80° C. for 8 h; a product was rotary-evaporated at 80° C., washed with hot ethanol at 50° C., washed with hot water at 50° C., and dried at 80° C. to obtain a flame retardant with a structure shown in Formula 3;

Formula 3

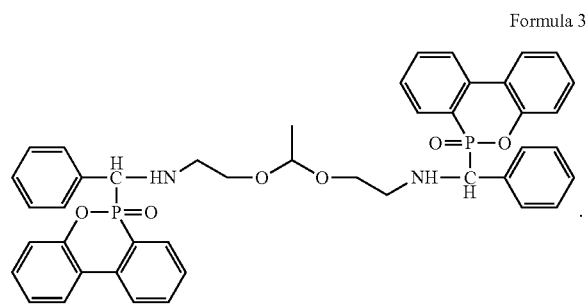 [SMILES: CC(OCCNC(c1ccccc1)P1(=O)Oc2ccccc2-c2ccccc21)OCCNC(c1ccccc1)P1(=O)Oc2ccccc2-c2ccccc21]

Example 3

In this example, a compound containing a terminal amino boronate sacrificial bond had a structural formula as follows:

0.05 mol of the compound containing a terminal amino boronate sacrificial bond was dissolved in tetrahydrofuran, added with 0.05 mol of benzaldehyde at 50° C., and a resulting mixture was added dropwise to a flask at 50° C. within 30 min; nucleophilic substitution was conducted under stirring for 6 h, 0.1 mol of DOPO was added, and an addition reaction was conducted at 80° C. for 8 h; a product was rotary-evaporated at 80° C., washed with hot ethanol at 50° C., washed with hot water at 50° C., and normally dried at 80° C. to obtain a flame retardant with a structure shown in Formula 4;

Formula 4

Example 4

In this example, a compound containing a terminal amino disulfide sacrificial bond had a structural formula as follows:

0.05 mol of the compound containing a terminal amino disulfide sacrificial bond was dissolved in tetrahydrofuran, added with 0.05 mol of benzaldehyde at 50° C., and a resulting mixture was added dropwise to a flask at 50° C. within 30 min; nucleophilic substitution was conducted under stirring for 6 h, 0.1 mol of DOPO was added, and an addition reaction was conducted at 80° C. for 8 h; a product was rotary-evaporated at 80° C., washed with hot ethanol at 50° C., washed with hot water at 50° C., and normally dried at 80° C. to obtain a flame retardant with a structure shown in Formula 5;

Formula 5

Example 5

In this example, a compound containing a terminal amino hemiacetal ester bond had a structural formula as follows:

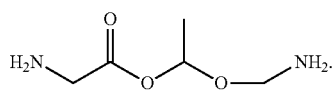

0.05 mol of the compound containing a terminal amino hemiacetal ester bond was dissolved in tetrahydrofuran, added with 0.05 mol of benzaldehyde at 50° C., and a resulting mixture was added dropwise to a flask at 50° C. within 30 min; nucleophilic substitution was conducted under stirring for 6 h, 0.1 mol of DOPO was added, and an addition reaction was conducted at 80° C. for 8 h; a product was rotary-evaporated at 80° C., washed with hot ethanol at 50° C., washed with hot water at 50° C., and normally dried at 80° C. to obtain a flame retardant with a structure shown in Formula 6;

Formula 6

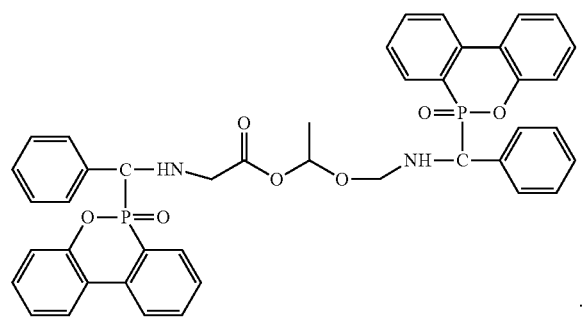

Example 6

In this example, a compound containing a terminal amino weak sacrificial bond had a structural formula as follows:

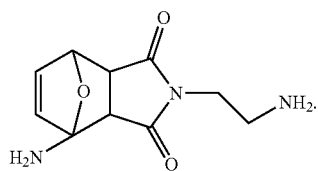 [SMILES: NCCN1C(=O)C2C3C=CC(N)(O3)C2C1=O]

0.05 mol of the compound containing a terminal amino weak sacrificial bond was dissolved in ethanol, added with 0.05 mol of benzaldehyde at 50° C., and a resulting mixture was added dropwise to a flask within 30 min; nucleophilic substitution was conducted under stirring for 6 h, 0.1 mol of DOPO was added, and an addition reaction was conducted at 80° C. for 8 h; a product was rotary-evaporated at 80° C., washed with hot ethanol at 50° C., washed with hot water at 50° C., and dried at 80° C. to obtain a flame retardant with a structure shown in Formula 7;

Formula 7

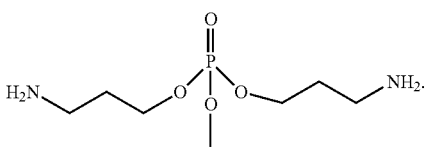

Example 7

In this example, a compound containing a terminal amino phosphate sacrificial bond had a structural formula as follows:

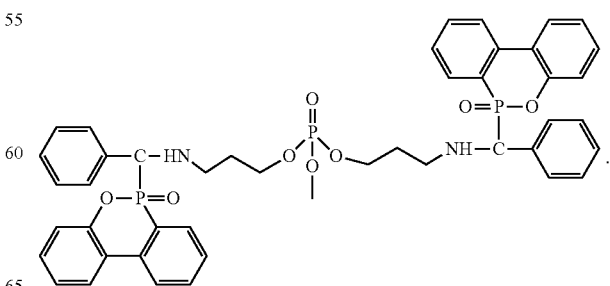

0.05 mol of the compound containing a terminal amino phosphate sacrificial bond was dissolved in ethanol, added with 0.05 mol of benzaldehyde at 50° C., and a resulting mixture was added dropwise to a flask within 30 min; nucleophilic substitution was conducted under stirring for 6 h, 0.1 mol of DOPO was added, and an addition reaction was conducted at 80° C. for 8 h; a product was rotary-evaporated at 80° C., washed with hot ethanol at 50° C., washed with hot water at 50° C., and dried at 80° C. to obtain a flame retardant with a structure shown in Formula 8;

Formula 8

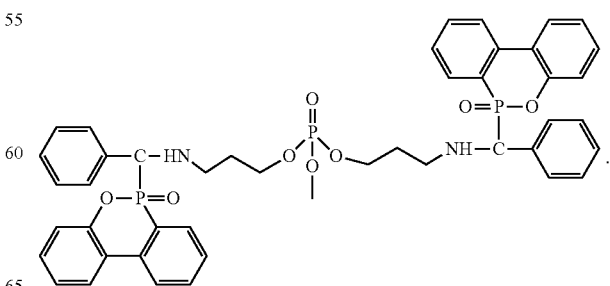

Example 8

In this example, a compound containing a terminal amino ionic bond had a structural formula as follows:

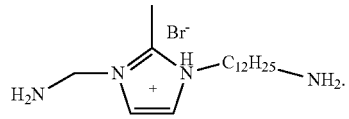

0.05 mol of the compound containing a terminal amino ionic bond was dissolved in ethanol, added with 0.05 mol of benzaldehyde at 50° C., and a resulting mixture was added dropwise to a flask within 30 min; nucleophilic substitution was conducted under stirring for 6 h, 0.1 mol of DOPO was added, and an addition reaction was conducted at 80° C. for 8 h; a product was rotary-evaporated at 80° C., washed with hot ethanol at 50° C., washed with hot water at 50° C., and dried at 80° C. to obtain a flame retardant with a structure shown in Formula 9;

Formula 9

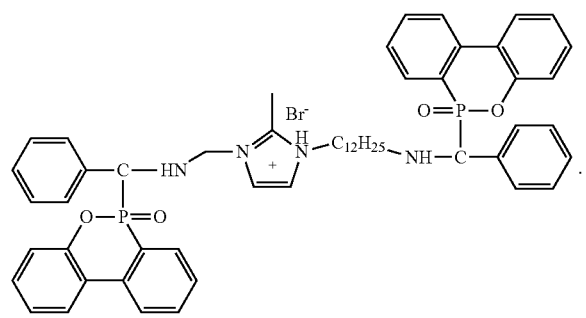

Use Example 1

In parts by weight, 35 parts of an epoxy resin E-51 preheated at 50° C. for 30 min, 1.2 parts of the flame retardant prepared in Example 1, 7 parts of an epoxy curing agent 4,4-diaminodiphenylmethane, and 0.2 parts of a phosphite antioxidant (specifically triethyl phosphite) were mixed and dissolved at 80° C. to obtain a homogeneous solution; the homogeneous solution was evacuated in a vacuum oven at 80° C. for 5 min, and then vertical burning test splines, limiting oxygen index test splines, tensile splines, and impact splines were casted according to a standard tetrafluoroethylene template.

Use Example 2

In parts by weight, 32 parts of a phenolic resin 7130A preheated at 50° C. for 30 min, 2 parts of the flame retardant prepared in Example 1, 7 parts of a phenolic resin curing agent p-toluenesulfonic acid, and 0.2 parts of a catalyst sodium hydroxide were mixed and stirred to obtain a homogeneous solution; the homogeneous solution was evacuated in a vacuum oven at 80° C. for 5 min, and then vertical burning test splines, limiting oxygen index test splines, tensile splines, and impact splines were casted according to a standard tetrafluoroethylene template.

Use Example 3

In parts by weight, 35 parts of a urea-formaldehyde resin preheated at 50° C. for 30 min, 2.5 parts of the flame retardant prepared in Example 1, 9 parts of a urea-formaldehyde resin curing agent ammonium chloride, and 0.2 part of a catalyst phenol were stirred to obtain a homogeneous solution; the homogeneous solution was evacuated in a vacuum oven at 80° C. for 5 min, and then vertical burning test splines, limiting oxygen index test splines, tensile splines, and impact splines were casted according to a standard tetrafluoroethylene template.

Use Example 4

In parts by weight, 35 parts of an epoxy resin E-51 preheated at 50° C. for 30 min, 1.2 parts of the flame retardant prepared in Example 2, 7 parts of an epoxy curing agent 4,4-diaminodiphenylmethane, and 0.2 parts of a phosphite antioxidant (specifically triethyl phosphite) were mixed and dissolved at 80° C. to obtain a homogeneous solution; the homogeneous solution was evacuated in a vacuum oven at 80° C. for 5 min, and then vertical burning test splines, limiting oxygen index test splines, tensile splines, and impact splines were casted according to a standard tetrafluoroethylene template.

Use Example 5

In parts by weight, 32 parts of a phenolic resin 7130A preheated at 50° C. for 30 min, 2 parts of the flame retardant prepared in Example 2, 7 parts of a phenolic resin curing agent p-toluenesulfonic acid, and 0.2 parts of a catalyst sodium hydroxide were mixed and stirred to obtain a homogeneous solution; the homogeneous solution was evacuated in a vacuum oven at 80° C. for 5 min, and then vertical burning test splines, limiting oxygen index test splines, tensile splines, and impact splines were casted according to a standard tetrafluoroethylene template.

Use Example 6

In parts by weight, 35 parts of a urea-formaldehyde resin preheated at 50° C. for 30 min, 2.5 parts of the flame retardant prepared in Example 2, 9 parts of a urea-formaldehyde resin curing agent ammonium chloride, and 0.2 part of a catalyst phenol were stirred to obtain a homogeneous solution; the homogeneous solution was evacuated in a vacuum oven at 80° C. for 5 min, and then vertical burning test splines, limiting oxygen index test splines, tensile splines, and impact splines were casted according to a standard tetrafluoroethylene template.

Use Example 7

In parts by weight, 35 parts of an epoxy resin E-51 preheated at 50° C. for 30 min, 1.2 parts of the flame retardant prepared in Example 3, 7 parts of an epoxy curing agent 4,4-diaminodiphenylmethane, and 0.2 parts of a phosphite antioxidant (specifically triethyl phosphite) were mixed and dissolved at 80° C. to obtain a homogeneous solution; the homogeneous solution was evacuated in a vacuum oven at 80° C. for 5 min, and then vertical burning test splines, limiting oxygen index test splines, tensile splines, and impact splines were casted according to a standard tetrafluoroethylene template.

Use Example 8

In parts by weight, 32 parts of a phenolic resin 7130A preheated at 50° C. for 30 min, 2 parts of the flame retardant prepared in Example 3, 7 parts of a phenolic resin curing agent p-toluenesulfonic acid, and 0.2 parts of a catalyst sodium hydroxide were mixed and stirred to obtain a homogeneous solution; the homogeneous solution was evacuated in a vacuum oven at 80° C. for 5 min, and then vertical burning test splines, limiting oxygen index test splines, tensile splines, and impact splines were casted according to a standard tetrafluoroethylene template.

Use Example 9

In parts by weight, 35 parts of a urea-formaldehyde resin preheated at 50° C. for 30 min, 2.5 parts of the flame retardant prepared in Example 3, 9 parts of a urea-formaldehyde resin curing agent ammonium chloride, and 0.2 part of a catalyst phenol were stirred to obtain a homogeneous solution; the homogeneous solution was evacuated in a vacuum oven at 80° C. for 5 min, and then vertical burning test splines, limiting oxygen index test splines, tensile splines, and impact splines were casted according to a standard tetrafluoroethylene template.

Use Example 10

In parts by weight, 35 parts of an epoxy resin E-51 preheated at 50° C. for 30 min, 1.2 parts of the flame retardant prepared in Example 4, 7 parts of an epoxy resin curing agent 4,4-diaminodiphenylmethane, and 0.2 parts of a phosphite antioxidant triethyl phosphite were mixed and stirred to obtain a homogeneous solution; the homogeneous solution was evacuated in a vacuum oven at 80° C. for 5 min, and then vertical burning test splines, limiting oxygen index test splines, tensile splines, and impact splines were casted according to a standard tetrafluoroethylene template.

Use Example 11

In parts by weight, 32 parts of a phenolic resin 7130A preheated at 50° C. for 30 min, 2 parts of the flame retardant prepared in Example 4, 7 parts of a phenolic resin curing agent p-toluenesulfonic acid, and 0.2 parts of a catalyst sodium hydroxide were mixed and stirred to obtain a homogeneous solution; the homogeneous solution was evacuated in a vacuum oven at 80° C. for 5 min, and then vertical burning test splines, limiting oxygen index test splines, tensile splines, and impact splines were casted according to a standard tetrafluoroethylene template.

Use Example 12

In parts by weight, 35 parts of a urea-formaldehyde resin preheated at 50° C. for 30 min, 2.5 parts of the flame retardant prepared in Example 4, 9 parts of a urea-formaldehyde resin curing agent ammonium chloride, and 0.2 part of a catalyst phenol were stirred to obtain a homogeneous solution; the homogeneous solution was evacuated in a vacuum oven at 80° C. for 5 min, and then vertical burning test splines, limiting oxygen index test splines, tensile splines, and impact splines were casted according to a standard tetrafluoroethylene template.

Use Example 13

In parts by weight, 35 parts of an epoxy resin E-51 preheated at 50° C. for 30 min, 1.2 parts of the flame retardant prepared in Example 5, 7 parts of an epoxy resin curing agent 4,4-diaminodiphenylmethane, and 0.2 parts of a phosphite antioxidant triethyl phosphite were mixed and stirred to obtain a homogeneous solution; the homogeneous solution was evacuated in a vacuum oven at 80° C. for 5 min, and then vertical burning test splines, limiting oxygen index test splines, tensile splines, and impact splines were casted according to a standard tetrafluoroethylene template.

Use Example 14

In parts by weight, 32 parts of a phenolic resin 7130A preheated at 50° C. for 30 min, 2 parts of the flame retardant prepared in Example 5, 7 parts of a phenolic resin curing agent p-toluenesulfonic acid, and 0.2 parts of a catalyst sodium hydroxide were mixed and stirred to obtain a homogeneous solution; the homogeneous solution was evacuated in a vacuum oven at 80° C. for 5 min, and then vertical burning test splines, limiting oxygen index test splines, tensile splines, and impact splines were casted according to a standard tetrafluoroethylene template.

Use Example 15

In parts by weight, 35 parts of a urea-formaldehyde resin preheated at 50° C. for 30 min, 2.5 parts of the flame retardant prepared in Example 5, 9 parts of a urea-formaldehyde resin curing agent ammonium chloride, and 0.2 part of a catalyst phenol were stirred to obtain a homogeneous solution; the homogeneous solution was evacuated in a vacuum oven at 80° C. for 5 min, and then vertical burning test splines, limiting oxygen index test splines, tensile splines, and impact splines were casted according to a standard tetrafluoroethylene template.

Use Example 16

In parts by weight, 35 parts of an epoxy resin E-51 preheated at 50° C. for 30 min, 1.2 parts of the flame retardant prepared in Example 6, 7 parts of an epoxy resin curing agent 4,4-diaminodiphenylmethane, and 0.2 parts of a phosphite antioxidant triethyl phosphite were mixed and stirred to obtain a homogeneous solution; the homogeneous solution was evacuated in a vacuum oven at 80° C. for 5 min, and then vertical burning test splines, limiting oxygen index test splines, tensile splines, and impact splines were casted according to a standard tetrafluoroethylene template.

Use Example 17

In parts by weight, 32 parts of a phenolic resin 7130A preheated at 50° C. for 30 min, 2 parts of the flame retardant prepared in Example 6, 7 parts of a phenolic resin curing agent p-toluenesulfonic acid, and 0.2 parts of a catalyst sodium hydroxide were mixed and stirred to obtain a homogeneous solution; the homogeneous solution was evacuated in a vacuum oven at 80° C. for 5 min, and then vertical burning test splines, limiting oxygen index test splines, tensile splines, and impact splines were casted according to a standard tetrafluoroethylene template.

Use Example 18

In parts by weight, 35 parts of a urea-formaldehyde resin preheated at 50° C. for 30 min, 2.5 parts of the flame retardant prepared in Example 6, 9 parts of a urea-formaldehyde resin curing agent ammonium chloride, and 0.2 part of a catalyst phenol were stirred to obtain a homogeneous solution; the homogeneous solution was evacuated in a vacuum oven at 80° C. for 5 min, and then vertical burning test splines, limiting oxygen index test splines, tensile splines, and impact splines were casted according to a standard tetrafluoroethylene template.

Use Example 19

In parts by weight, 35 parts of an epoxy resin E-51 preheated at 50° C. for 30 min, 1.2 parts of the flame retardant prepared in Example 7, 7 parts of an epoxy resin curing agent 4,4-diaminodiphenylmethane, and 0.2 parts of a phosphite antioxidant triethyl phosphite were mixed and stirred to obtain a homogeneous solution; the homogeneous solution was evacuated in a vacuum oven at 80° C. for 5 min, and then vertical burning test splines, limiting oxygen index test splines, tensile splines, and impact splines were casted according to a standard tetrafluoroethylene template.

Use Example 20

In parts by weight, 32 parts of a phenolic resin 7130A preheated at 50° C. for 30 min, 2 parts of the flame retardant prepared in Example 7, 7 parts of a phenolic resin curing agent p-toluenesulfonic acid, and 0.2 parts of a catalyst sodium hydroxide were mixed and stirred to obtain a homogeneous solution; the homogeneous solution was evacuated in a vacuum oven at 80° C. for 5 min, and then vertical burning test splines, limiting oxygen index test splines, tensile splines, and impact splines were casted according to a standard tetrafluoroethylene template.

Use Example 21

In parts by weight, 35 parts of a urea-formaldehyde resin preheated at 50° C. for 30 min, 2.5 parts of the flame retardant prepared in Example 7, 9 parts of a urea-formaldehyde resin curing agent ammonium chloride, and 0.2 part of a catalyst phenol were stirred to obtain a homogeneous solution; the homogeneous solution was evacuated in a vacuum oven at 80° C. for 5 min, and then vertical burning test splines, limiting oxygen index test splines, tensile splines, and impact splines were casted according to a standard tetrafluoroethylene template.

Use Example 22

In parts by weight, 35 parts of an epoxy resin E-51 preheated at 50° C. for 30 min, 1.2 parts of the flame retardant prepared in Example 8, 7 parts of an epoxy resin curing agent 4,4-diaminodiphenylmethane, and 0.2 parts of a phosphite antioxidant triethyl phosphite were mixed and stirred to obtain a homogeneous solution; the homogeneous solution was evacuated in a vacuum oven at 80° C. for 5 min, and then vertical burning test splines, limiting oxygen index test splines, tensile splines, and impact splines were casted according to a standard tetrafluoroethylene template.

Use Example 23

In parts by weight, 32 parts of a phenolic resin 7130A preheated at 50° C. for 50 min, 2 parts of the flame retardant prepared in Example 8, 7 parts of a phenolic resin curing agent p-toluenesulfonic acid, and 0.2 parts of a catalyst sodium hydroxide were mixed and stirred to obtain a homogeneous solution; the homogeneous solution was evacuated in a vacuum oven at 80° C. for 5 min, and then vertical burning test splines, limiting oxygen index test splines, tensile splines, and impact splines were casted according to a standard tetrafluoroethylene template.

Use Example 24

In parts by weight, 35 parts of a urea-formaldehyde resin preheated at 50° C. for 30 min, 2.5 parts of the flame retardant prepared in Example 8, 9 parts of a urea-formaldehyde resin curing agent ammonium chloride, and 0.2 part of a catalyst phenol were stirred to obtain a homogeneous solution; the homogeneous solution was evacuated in a vacuum oven at 80° C. for 5 min, and then vertical burning test splines, limiting oxygen index test splines, tensile splines, and impact splines were casted according to a standard tetrafluoroethylene template.

Performance Testing:

1. Limiting Oxygen Index Test

Measurement was conducted according to ASTM D2863-97 standard to obtain a limiting oxygen index value of the material. The value represents a minimum volume percentage of oxygen content required to maintain combustion after the material is ignited in a mixture of oxygen and nitrogen. A higher limiting oxygen index value leads to less flammability of the material, that is, a better flame retardancy. It is generally believed that flammable materials have a limiting oxygen index of less than 22%, combustible materials have a limiting oxygen index of 22% to 27%, and flame-retardant materials have a limiting oxygen index of greater than 27%.

2. Vertical Burning Test

Test was conducted according to ASTM D3801 standard to obtain a vertical burning level of the material. The level can reflect a flame propagation performance on a surface of the material. According to a certain flame height and a certain flame application angle, the material test spline with a specific specification in a vertical state is regularly flamed several times. The burning level of the material is comprehensively evaluated by a duration of material ignition and scorching burning, and whether an igniting content under the material is ignited. Among them, V-0 means the highest level, followed by V-1, V-2, and no-level in sequence.

3. Tensile Strength Test

Test was conducted according to ASTM D638 standard to obtain a tensile strength value of the material. The value represents a maximum tensile stress that the material can withstand when being stretched until breaking. A larger tensile strength value means a stronger ability of the material to resist permanent deformation and failure under the action of an external force.

4. Impact Strength Test

Test was conducted according to ASTM D638 standard to obtain an impact strength value of the material, indicating a maximum force that the material can withstand suddenly under the action of an external force.

The products obtained from Use Examples 1 to 24 were tested for performance according to the above method, and the test results were shown in Table 1.

TABLE 1

Flame-retardant properties and mechanical properties of Use Examples 1 to 24 and corresponding pure thermosetting resins

| Polymer matrix | Flame-retardant test | | Mechanical test | |
|---|---|---|---|---|
| | vertical burning level UL-94 | Limiting oxygen index (LOI, %) | Tensile strength (Mpa) | Impact strength (KJ/m$^2$) |
| Pure epoxy resin | No level | 23.5 | 56 | 9.3 |
| Use Example 1 | V-0 | 33 | 70 | 13.8 |
| Use Example 4 | V-0 | 32 | 68 | 12.3 |
| Use Example 7 | V-0 | 34 | 72 | 12.7 |
| Use Example 10 | V-0 | 35 | 69 | 13.6 |
| Use Example 13 | V-0 | 32 | 70 | 13.2 |
| Use Example 16 | V-0 | 34 | 71 | 13.4 |
| Use Example 19 | V-0 | 33 | 72 | 13.8 |
| Use Example 22 | V-0 | 32 | 70 | 13.0 |
| Pure phenolic resin | No level | 22.3 | 55 | 8.6 |
| Use Example 2 | V-0 | 32 | 71 | 12 |
| Use Example 5 | V-0 | 31 | 69 | 11.5 |
| Use Example 8 | V-0 | 30 | 78 | 13.1 |
| Use Example 11 | V-0 | 33 | 67 | 12.6 |
| Use Example 14 | V-0 | 33 | 72 | 13.0 |
| Use Example 17 | V-0 | 35 | 68 | 10 |
| Use Example 20 | V-0 | 32 | 69 | 11.0 |
| Use Example 23 | V-0 | 31 | 67 | 12.1 |
| Pure urea-formaldehyde resin | No level | 22.0 | 56 | 8.9 |
| Use Example 3 | V-0 | 32 | 67 | 11.8 |
| Use Example 6 | V-0 | 30 | 68 | 12.3 |
| Use Example 9 | V-0 | 33 | 70 | 14 |
| Use Example 12 | V-0 | 34 | 72 | 13.5 |
| Use Example 15 | V-0 | 32 | 71 | 14.2 |
| Use Example 18 | V-0 | 31 | 72 | 12.3 |
| Use Example 21 | V-0 | 32 | 70 | 12.8 |
| Use Example 24 | V-0 | 30 | 69 | 13.0 |

It can be seen from the results in Table 1 that in the present disclosure, by adding a flame retardant with a specific structure, the flame-retardant thermosetting resin has excellent flame retardancy and greatly-improved tensile properties and impact properties compared with pure thermosetting resins.

The above description of examples is merely provided to help illustrate the method of the present disclosure and a core idea thereof. It should be noted that several improvements and modifications may be made by persons of ordinary skill in the art without departing from the principle of the present disclosure, and these improvements and modifications should also fall within the protection scope of the present disclosure. Various amendments to these embodiments are apparent to those of professional skill in the art, and the general principles defined herein may be implemented in other embodiments without departing from the spirit or scope of the present disclosure. Thus, the present disclosure is not limited to the examples shown herein but falls within the widest scope consistent with the principles and novel features disclosed herein.

What is claimed is:

1. A reactive flame retardant, having a structure shown in Formula 1:

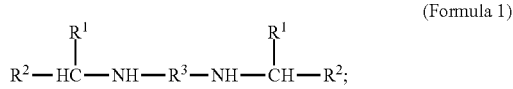

(Formula 1)

wherein in Formula 1,

—$R^1$ has an atomic composition as follows:

—[(CH)$_n$(CH$_2$)$_m$(CH$_3$)$_p$(C)$_r$(OH)$_y$(COOH)$_l$O$_x$H$_z$], and n, m, p, r, y, l, x, and z are independently an integer of 0 to 20 but are not 0 at the same time;

—$R^2$ has an atomic composition as follows:

—PO[(CH$_2$)$_{n'}$(CH)$_{m'}$(CH$_3$)$_{p'}$(C)$_{r'}$(OH)$_{y'}$(COOH)$_{l'}$O$_{x'}$H$_{z'}$], and n', m', p', r', y', l', x', and z' are independently an integer of 0 to 20 but are not 0 at the same time; and —$R^3$— is any one of structures shown in (a) to (i):

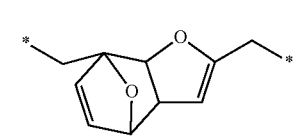

(a)

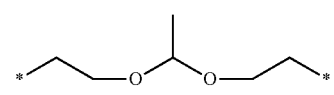

(b)

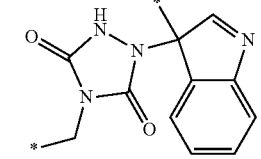

(c)

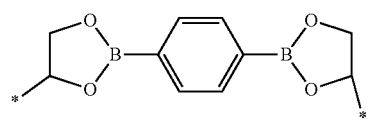

(d)

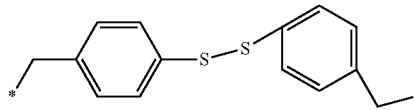

(e)

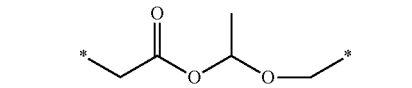

(f)

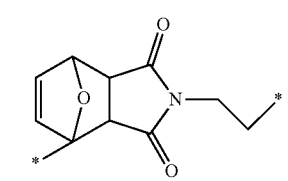

(g)

(h)

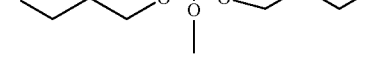

(i)

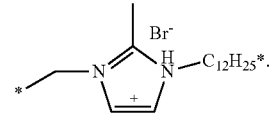

2. The reactive flame retardant according to claim 1, wherein —R¹ is:
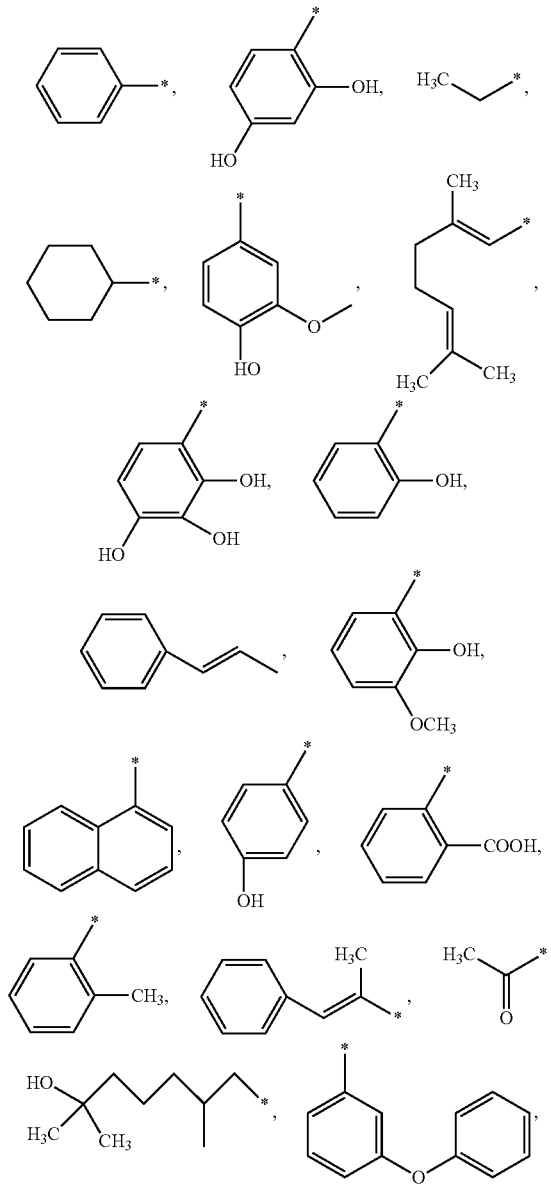
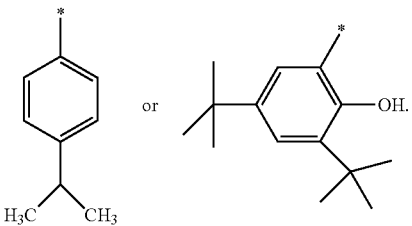
3. The reactive flame retardant according to claim 1, wherein —R² is:
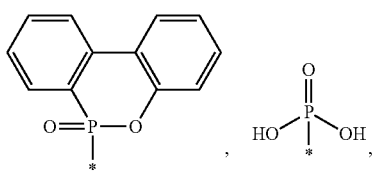
4. The reactive flame retardant according to claim 1, having a structure shown in any one of Formula 2 to Formula 9:
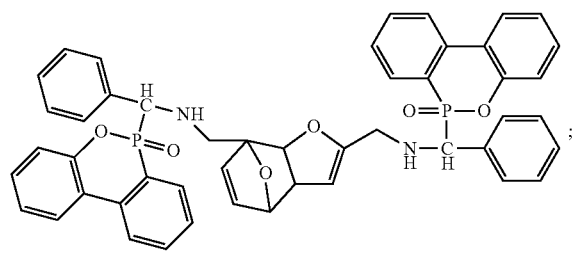
(Formula 2)
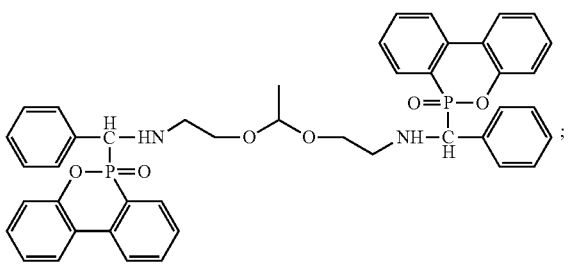
(Formula 3)

-continued
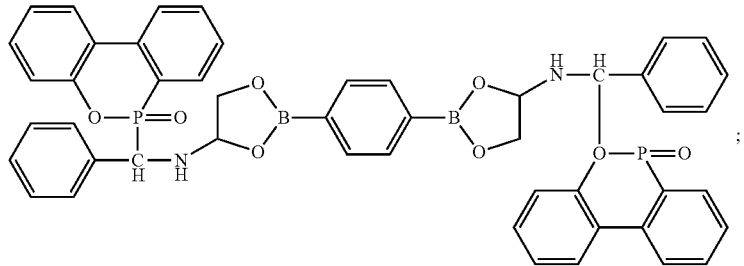
(Formula 4)
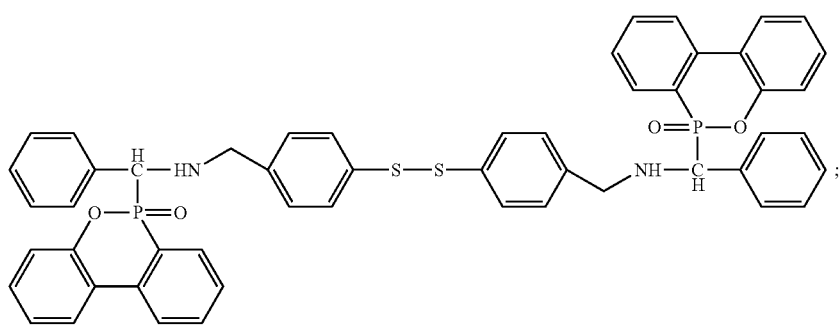
(Formula 5)
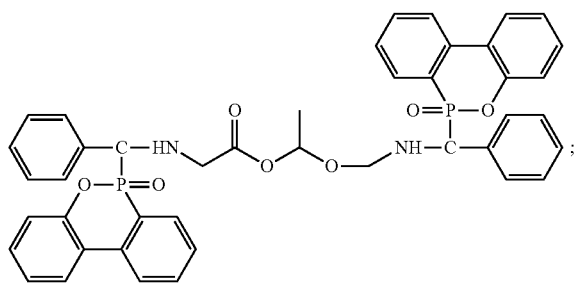
(Formula 6)
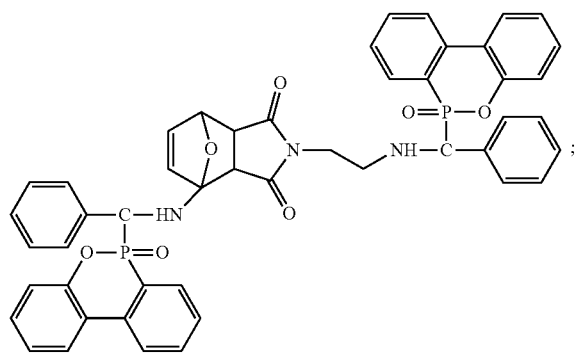
(Formula 7)
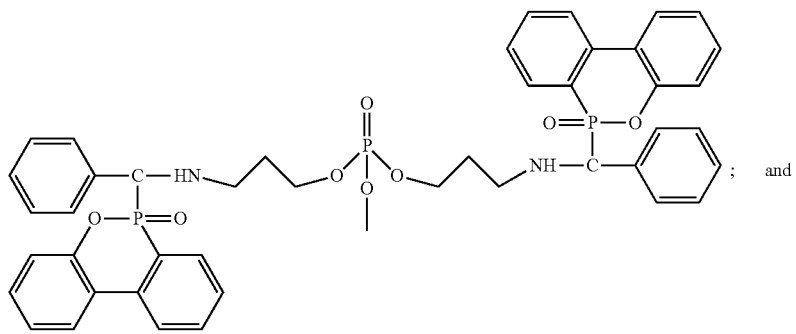
(Formula 8)
; and -continued

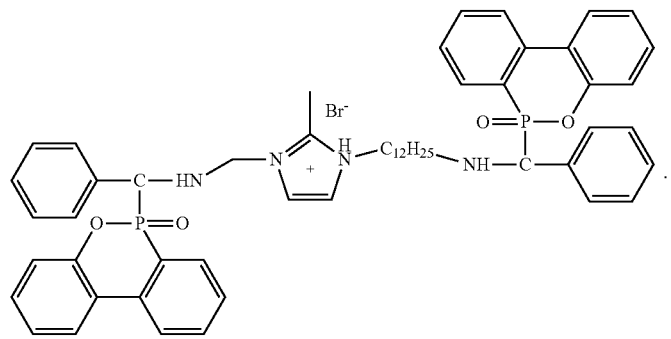

(Formula 9)

5. A preparation method of the reactive flame retardant according to claim 1, comprising the following steps:
dissolving H$_2$N—R$^3$—NH$_2$ in a polar organic solvent, adding R$^1$CHO to an obtained solution, and conducting nucleophilic substitution to obtain

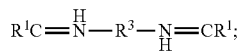

and
mixing the

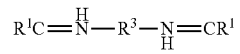

with R$^2$H, and conducting an addition reaction to obtain the reactive flame retardant having a structure shown in Formula 1 as follows:

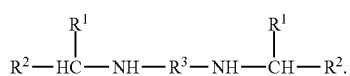

(Formula 1)

6. The preparation method according to claim 5, wherein the H$_2$N—R$^3$—NH$_2$ and the R$^1$CHO have a molar ratio of 1:2.

7. The preparation method according to claim 5, wherein the

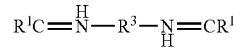

and the R$^2$H have a molar ratio of 1:2.

8. The preparation method according to claim 5, wherein the polar organic solvent is selected from the group consisting of a monohydric alcohol and a cyclic ether.

9. The preparation method according to claim 8, wherein the monohydric alcohol comprises ethanol; and the cyclic ether comprises tetrahydrofuran.

10. The preparation method according to claim 5, wherein the nucleophilic substitution is conducted at 30° C. to 80° C.

11. The preparation method according to claim 5, wherein the nucleophilic substitution is conducted for 8 hours to 12 hours.

12. The preparation method according to claim 5, wherein the addition reaction is conducted at 30° C. to 80° C.

13. The preparation method according to claim 5, wherein the addition reaction is conducted for 8 hours to 24 hours.

14. The preparation method according to claim 5, further comprising the following steps after the addition reaction is completed: removing the polar organic solvent in an obtained addition reaction product, and washing and drying the addition reaction product sequentially.

15. A flame-retardant thermosetting resin, comprising the following raw materials in parts by weight: 30 parts to 35 parts of a thermosetting resin, 1 part to 3 parts of a flame retardant, and 7 parts to 9 parts of a curing agent; wherein the flame retardant is the reactive flame retardant according to claim 1.

16. The flame-retardant thermosetting resin according to claim 15, wherein the thermosetting resin is selected from the group consisting of an epoxy resin, a phenolic resin, a urea-formaldehyde resin, and an unsaturated polyester.

17. The flame-retardant thermosetting resin according to claim 16, wherein when the thermosetting resin is the epoxy resin, the curing agent comprises one or more of 4,4-diaminodiphenylmethane, 4,4-diaminophenylsulfone, methyltetrahydrophthalic anhydride, and methylhexahydrophthalic anhydride;
when the thermosetting resin is the phenolic resin, the curing agent comprises one or more of p-toluenesulfonic acid, benzenesulfonic acid, phosphoric acid, and phenolsulfonic acid;
when the thermosetting resin is the urea-formaldehyde resin, the curing agent comprises one or more of ammonium chloride, phosphoric acid, and hydrogen peroxide; and
when the thermosetting resin is the unsaturated polyester, the curing agent comprises divinylbenzene and/or methyl ethyl ketone peroxide.

18. The flame-retardant thermosetting resin according to claim 15, further comprising 0.2 parts to 0.5 parts of an auxiliary agent.

19. The flame-retardant thermosetting resin according to claim 18, wherein when the thermosetting resin is the epoxy resin, the auxiliary agent comprises an antioxidant;
when the thermosetting resin is the phenolic resin or the urea-formaldehyde resin, the auxiliary agent comprises a catalyst; and
when the thermosetting resin is the unsaturated polyester, the auxiliary agent comprises an accelerator.

20. The flame-retardant thermosetting resin according to claim 19, wherein the antioxidant is selected from the group consisting of a phosphite antioxidant, a hindered phenol antioxidant, and a hindered amine antioxidant;
  when the thermosetting resin is the phenolic resin, the catalyst comprises one or more of sodium hydroxide, ammonia water, and ammonium sulfate; when the thermosetting resin is the urea-formaldehyde resin, the catalyst comprises phenol; and
the accelerator comprises cobalt naphthenate.

\* \* \* \* \*